April 21, 1925.
S. COHEN
CONDENSER
Filed Feb. 17, 1925
1,534,160
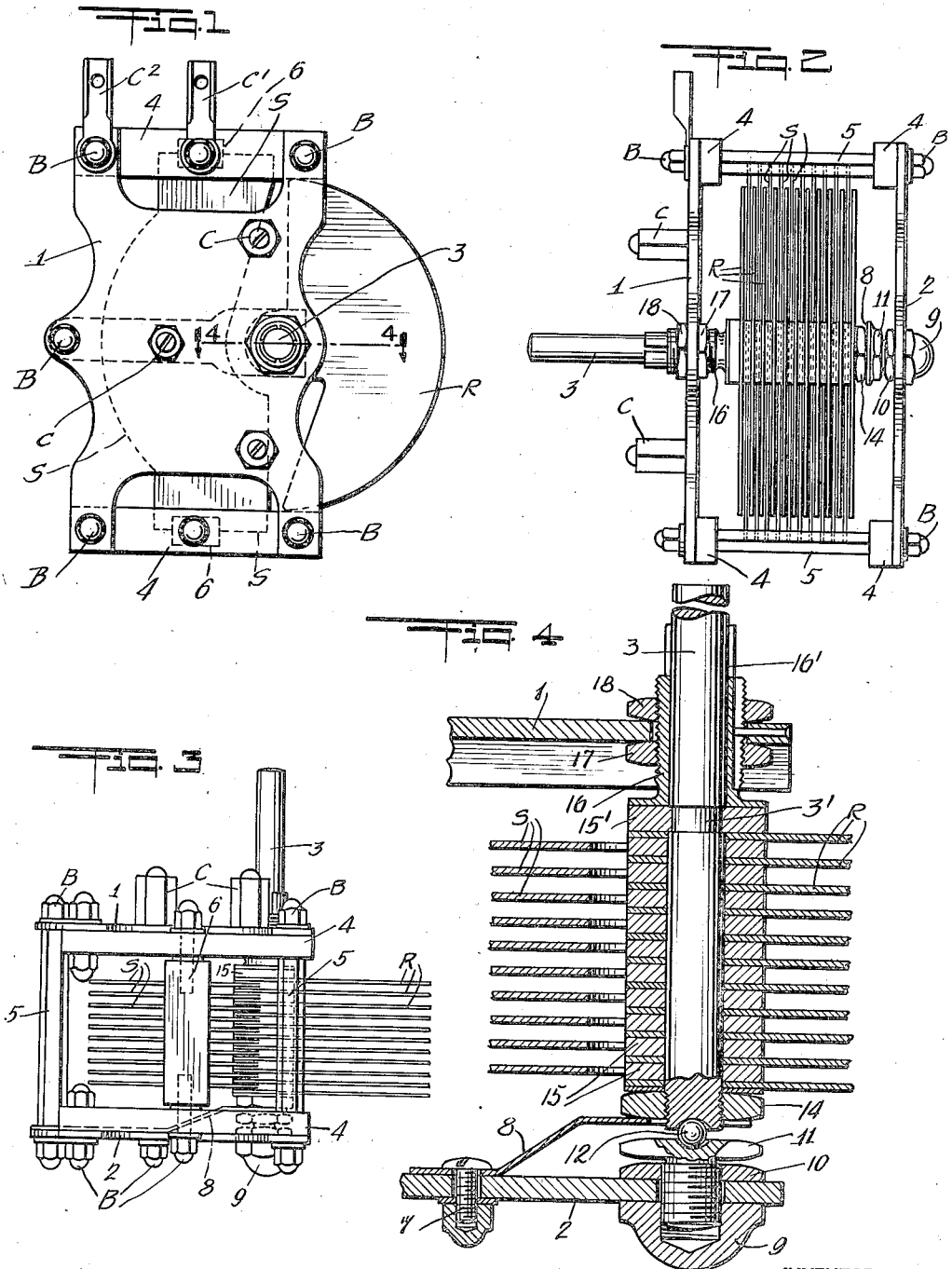
INVENTOR
Samuel Cohen
BY
ATTORNEYS Patented Apr. 21, 1925.

1,534,160

UNITED STATES PATENT OFFICE.

SAMUEL COHEN, OF BROOKLYN, NEW YORK.

CONDENSER.

Application filed February 17, 1925. Serial No. 9,754.

*To all whom it may concern:*

Be it known that I, SAMUEL COHEN, a citizen of the United States, residing at Brooklyn, in the county of Kings, city and State of New York, have invented certain new and useful Improvements in Condensers, of which the following is a specification.

My invention relates to a new and improved form of condenser.

One of the objects of my invention is to provide a new and improved form of condenser which will be especially adapted for use with alternating currents of high frequency as, for example, in radio receiving circuits.

Another object of my invention is to produce a condenser in which the losses due to the use of the condenser in radio receiving circuits are minimized.

Another object of my invention is to provide a condenser of a simple and efficient construction whereby the parts may be readily assembled and are firmly and reliably held in position.

Another object of my invention is to provide a condenser embodying a ball-bearing or similar antifriction bearing so that the adjustment of the condenser is facilitated.

Other objects of my invention will be set forth in the following description and drawings which illustrate a preferred embodiment of my invention.

Fig. 1 is a top view.

Fig. 2 is a front elevation.

Fig. 3 is an end elevation.

Fig. 4 is a section on the line 4—4 of Fig. 1.

In condensers as previously constructed and especially in those adapted for use in radio receiving circuits, the condenser consisted substantially of a series of stator plates and a series of rotor plates which were mounted between supporting plates formed of various insulating materials. Since the material of which such insulating plates was composed had a high dielectric constant, this resulted in substantial capacity effects at the ends of the condenser whereby a substantial amount of the energy transmitted to the condenser was dissipated.

According to my invention, the end plates of the condenser are made of conducting material so that these losses are obviated and the rotor plates are insulated from the stator plates by means of strips or mounts of insulating material which are located so that they are preferably laterally disposed with respect to the rotor plates so as to obviate the above mentioned undesirable effect.

As shown in the above mentioned drawings, the stator plates S are mounted between metal end plates 1 and 2.

The stator plates S are firmly and rigidly mounted in spaced relationship, in spaced and symmetrically disposed grooves of metal stator supports 6. The stator supports 6 have reduced ends which pass through narrow supporting strips 4 which may be made of insulating material. The stator supports 6 are firmly held in position by any suitable means. Thus, they may be held in place by bolt members B provided with threaded shanks which pass through the insulating strips 4 and enter correspondingly threaded orifices in the stator supports 6. The threading of the shanks of the said members B has been omitted in Fig. 3 for the sake of clearness.

The metal end plates 1 and 2, which can be made of cast aluminum or any other suitable metal are connected by any suitable number of metal member 5, three of such members 5 being illustrated in this embodiment. The ends of the said spacing members 5 are internally threaded and bolts B are provided as shown in Figs. 1, for example, for firmly holding the end plates to the said spacing members 5.

The rotor plates are electrically connected to the said end plates by means of the spindle 3 and the parts supplemental to the said spindle 3.

As clearly shown in Fig. 4, the end plate 2 is provided with an outer nut 9 and an inner lock nut 10 which firmly hold in position the threaded shank of a ball-bearing member 11. The said ball-bearing member 11 serves to support a ball 12 which fits in a corresponding recess at the threaded inner end of the spindle 3. The inner end of the spindle 3 is in contact with the ordinary blade spring 8, which is secured to the plate 2 by means of the screw 7 and a lock nut as shown in Fig. 4. The rotor plates R have the usual spacing members 15 between them and they are held in place at the inner end of the spindle by means of the nut 14. The spindle 3 may be provided with a portion 3' of reduced diameter having a washer 15' adjacent thereto.

The outer end of the spindle 3 passes through an externally threaded member 16 which co-operates with the washer 15' and the nut 14 to firmly hold the rotor plates R in proper position.

The lock member 16 passes through a suitable opening in the end plate 1 and it is firmly held in position by means of the nuts 17 and 18. The lock member 16 is provided with a longitudinal slot 20 which can be engaged by means of a lock pin 19 which is forced into the end plate 1 as shown in Fig. 4 so that the said lock member 16 is prevented from revolving when the spindle 3 is revolved.

The lock member 16 terminates in a portion of smaller external diameter and this outer portion or sleeve may have one or more longitudinal slits 16' formed therein so that it can fit very tightly over the adjacent part of the spindle 3.

The rotor plates R are thus firmly held in proper position upon the spindle 3 and it is obvious that the device can be very readily assembled and taken apart.

One of the members 6 can have an ordinary connecting member C' connected thereto as shown in Fig. 1 and a similar connecting member C² is connected to the end plate 1. It is immaterial whether the member C² is connected to the left or to the right of the connecting member C'.

For connecting the condenser to any suitable support, three screws are mounted in suitably threaded openings of one of the end plates and these have spacing sleeves C loosely and slidably mounted thereon, the heads of the screws being sufficiently large to prevent the said sleeves C from falling off when the device is shipped.

As can be clearly seen in Fig. 2 the insulating strips 4 are offset or laterally disposed with respect to the ends of the rotor plates R so as to have little or no effect upon the charge in the said condenser.

It is also obvious that all the parts can be made of metal save, of course, for the insulating strips 4 so that the device is made with a minimum amount of relatively expensive insulating material. The minimizing of the amount of insulating material also produces a stronger article since the ordinary insulating material is more fragile than metal.

I have shown a preferred embodiment of my invention but it is clear that numerous changes and omissions could be made without departing from its spirit.

I claim:—

1. In a condenser, the combination of end plates having aligned openings, a ball bearing member having a threaded shank extending through one of said openings, nuts threaded upon the said shank and located upon opposite sides of the adjacent end plate and adapted to hold the said ball bearing member in position, a hollow and externally threaded locking member passing through the opening in the other end plate, nuts mounted upon the externally threaded shank of said locking member and located upon opposite sides of the adjacent end plate and adapted to hold the said locking member in position, means adapted to prevent the revolution of the said locking member, a spindle passing through the said hollow locking member and having its inner end adapted to hold a ball in co-operation with the said ball bearing member, the end of said spindle adjacent the said ball having a lock nut, a series of rotor plates having intermediate spacing members mounted upon the said spindle intermediate the lock nut and the adjacent end of the said locking member, the said rotor plates being adapted to be firmly held in spaced relationship between the said locking member and the said lock nut.

2. A condenser comprising conducting end plates, insulating members connected to the said end plates, spacing members connected to the said insulating members and adapted to hold a series of stator plates in spaced relationship, the said conducting end plates having aligned openings intermediate the said insulating members, a ball bearing member having a threaded shank extending through one of said openings, nuts threaded upon the said shank and located upon opposite sides of the adjacent end plate and adapted to hold the said ball bearing member in position, a hollow and externally threaded locking member passing through the opening in the other end plate, nuts mounted upon the externally threaded shank of said locking member and located upon opposite sides of the adjacent end plate and adapted to hold the said locking member in position, means adapted to prevent the revolution of the said locking member, a spindle passing through the said hollow locking member and having its inner end adapted to hold a ball in co-operation with the said ball bearing member, the end of said spindle adjacent the said ball having a lock nut, a series of rotor plates having intermediate spacing members mounted upon the said spindle intermediate the lock nut and the adjacent end of the said locking member, the said rotor plates being adapted to be firmly held in spaced relationship between the said locking member and the said lock nut.

In testimony whereof I hereunto affix my signature.

SAMUEL COHEN.